Patented June 10, 1952

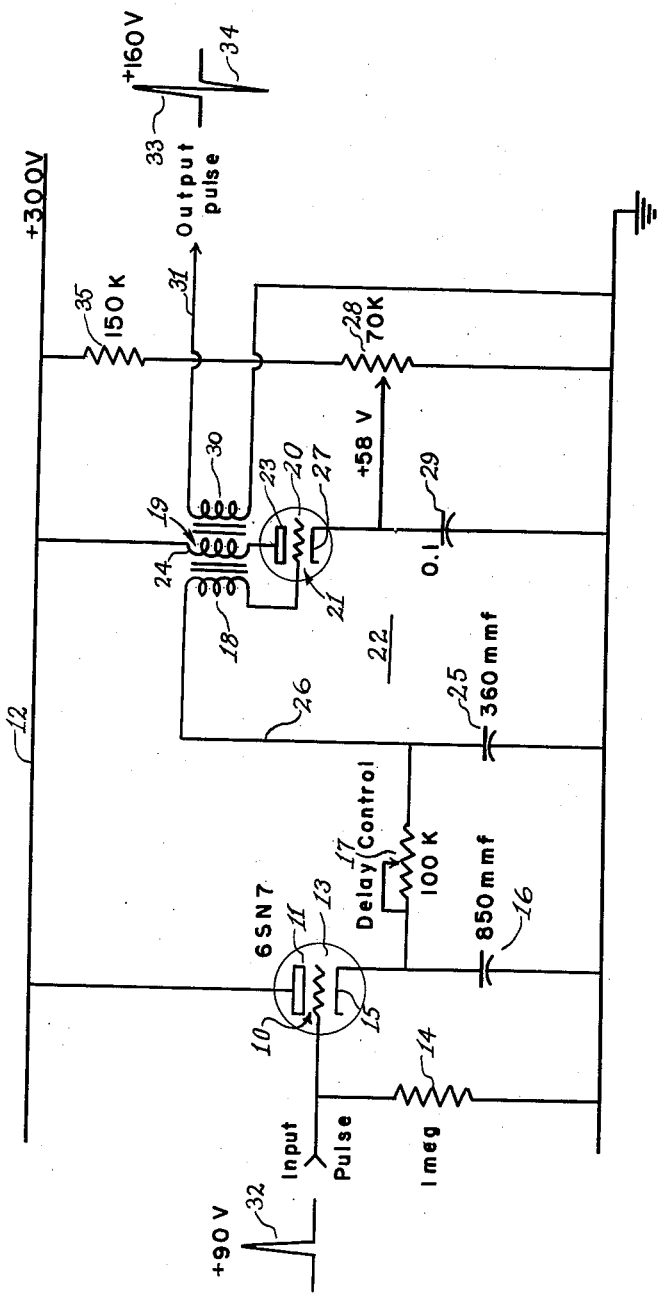

2,600,270

UNITED STATES PATENT OFFICE 2,600,270

MICROSECOND DELAY CIRCUIT

Norman B. Saunders, Cambridge, Mass., assignor to United States of America as represented by the Executive Secretary of the Office of Scientific Research and Development Application June 25, 1946, Serial No. 679,125

2 Claims. (Cl. 250—27)

This invention relates to an improved microsecond pulse delay circuit.

In connection with designing certain types of radar equipment, there has been found to be necessary a delay circuit giving a sharp pulse output after a variable time of between one-tenth micro-second and thirty micro-seconds from the input of the sharp pulse.

An object of the invention is to provide a delay circuit capable of producing the operating characteristics noted. Other objects will appear from the following description of the invention.

As illustrative of one suitable means of accomplishing this objective, I have designed the circuit illustrated in the accompanying drawing. There is illustrated a first triode 10, which may be a 6SN7, functioning as a cathode follower, the plate 11 of which is connected directly to a 300 volt B supply 12, the negative of which is at ground. Its grid 13 has a high resistance leak 14 of 1 megohm to ground, and its cathode 15 is coupled by an 850 mmf. blocking and storage condenser 16 to ground. The cathode 15 is connected through a variable resistance 17 and first secondary 18 of a transformer 19 to the grid 20 of a second triode 21 forming part of a blocking oscillator 22. The plate 23 of this tube is connected through the primary 24 of the transformer to the B supply 12. A second storage condenser 25 of 360 mmf. is connected between ground and the lead 26 from the resistance 17 to transformer 19 as a part of the tank for the grid 20 in the blocking oscillator.

The cathode 27 of the tube 21 is returned to ground through a variable resistance 28, and a shunt condenser 29 of 0.1 mf. This resistor 28, having indicated value of 70 K, and a resistor 35 of 150 K thereabove, are connected in series across the line of the B supply and together constitute a potentiometer by which the bias of the oscillator tube 21 is regulated, this bias being indicated as 58 volts, for instance, provided the input signal is a positive pulse of, say, 90 volts as indicated at 32. The secondary 30 of the transformer 19 is connected at one end to ground and at the other to the output lead 31.

A positive pulse, substantially of the value and shape shown at 32 arriving at the input, the grid of the first tube, will produce a strong positive pulse at the cathode 15 rapidly charging the condenser 16, the charge leaking across the resistor 17 to the condenser 25, building up a positive potential therein and on the grid 20 of the second tube. When this potential has risen to a value sufficient in relation to the adjustment of bias at resistor 28, the tube 21 will fire. The sharp negative-going drop of potential at the plate results in current and build-up of a field at the primary 24, which gives in secondary 30 the short high amplitude pulse rise 33. Absence of leak from the grid 21 to ground, with consequent build-up of negative charge thereon incident to the discharge across the tube, as well as the feed-back from coil 18 (after accelerating the firing pulse on the grid) producing a negative-going component, operate to terminate the positive pulse on the grid, and this is hastened by rise of potential at the cathode 27, so as to effect a very prompt cut-off of the tube. The sudden restoration of static potential at the plate incident to cut-off, and consequent abrupt decay of the field of primary 24 will produce the sharp, short, extremely negative potential termination 34 of the output pulse.

Such a pulse shape is valuable in assuring very positive functioning of pulse-responsive circuits generally, where prompt termination of the action of the pulse is desired.

Restoration of the normal bias in tube 21 will occur by leakage of the excess positive charge across resistor 28, and possibly by a certain grid 20 charge feed to cathode 15, after the condensers 25 and 16 have been negatively charged from this grid and cathode 15 brought to its normal static potential.

Condenser 29 may serve to regulate the length and amplitude of the output pulse.

The circuit illustrated is peculiarly effective in enabling the production of the delayed pulse in good shape with exceedingly fine timing, as required in peculiar parts of modern radar and other systems of similar principle.

While the two tubes illustrated are triodes, it will be understood that these three elements are the essentials, and that modifications are possible using tetrodes or pentodes without departing from the spirit of the invention.

In the circuit the coupling time constant is such that a step function at the input appears as a pulse at the grid of the cathode follower 10. This cathode follower by virtue of the large cathode resistance with relatively large by-pass at 17 converts the pulse upon its grid into a practically isolated charge on condenser 16 becoming gradually effective at grid 20. The variable resistance 17 in series with the second capacitor 25 causes the second capacitor to charge exponentially from the voltage on condenser 16. The changing rate and hence the time required for the capacitor 25 to charge to a given voltage is varied at will by adjustment of the resistor 17. At the given voltage the blocking oscillator fires to produce the output pulse.

This circuit as illustrated is capable of working smoothly with delays of a tenth of a microsecond to eight micro-seconds. This range may be extended by appropriately altering the parameter values in the circuit shown in the drawings.

In comparison with other delay means it should be observed that multi-vibrators, for example, often used to give controllable delays are not satisfactory for delays of less than perhaps ten micro-seconds. In comparison with delay means such as transmission lines with either lumped or distributed constants it should be noted that although the latter means are used for delays of less than ten micro-seconds it is difficult to vary the length of the delay and particularly to make the variation continuous.

From the foregoing description, therefore, it will be evident that I have provided an efficient and positive means to accomplish the purposes noted. Various modifications of the invention may be resorted to within the scope of the appended claims.

I claim:

1. A microsecond delay circuit for delivering a shaped output pulse with predetermined delay responsive to pulse input, consisting of a first triode having a high resistance grid to ground return, a second triode, a variable resistance in series between the cathode of the first tube and the grid of the second tube, a blocking capacitance in series between the cathode of the first tube and ground, a smaller blocking capacitance in series between the grid of the second tube and ground, a cathode resistance of the second tube returned to ground, a B current supply connected to the anodes of the tubes and to ground, means to bias the second tube at will to a predetermined level related to a given input pulse to be responded to, means coupled to the second tube to transmit said output pulse, and means responsive to conduction in the second tube to block the same.

2. The circuit of claim 1 wherein the means to block the second tube comprises a three element transformer, a direct lead from the first-named resistance to the grid of the second tube including a secondary of the transformer, said smaller capacitance being between said lead and ground, the plate circuit of the second tube including the primary of the transformer, a second secondary of the transformer constituting the said means to transmit said output pulse, and a by-pass condenser between the cathode of the second tube and ground.

NORMAN B. SAUNDERS.

REFERENCES CITED

The following references are of record in the file of this patent:

UNITED STATES PATENTS

| Number | Name | Date |
|---|---|---|
| 2,113,011 | White | Apr. 5, 1938 |
| 2,276,708 | Wyckoff | Mar. 17, 1942 |
| 2,354,086 | MacKay | July 18, 1944 |
| 2,411,573 | Holst et al. | Nov. 26, 1946 |
| 2,419,340 | Easton | Apr. 22, 1947 |
| 2,447,661 | Mumma et al. | Aug. 24, 1948 |
| 2,448,814 | Mann et al. | Sept. 7, 1948 |